Figure 1:
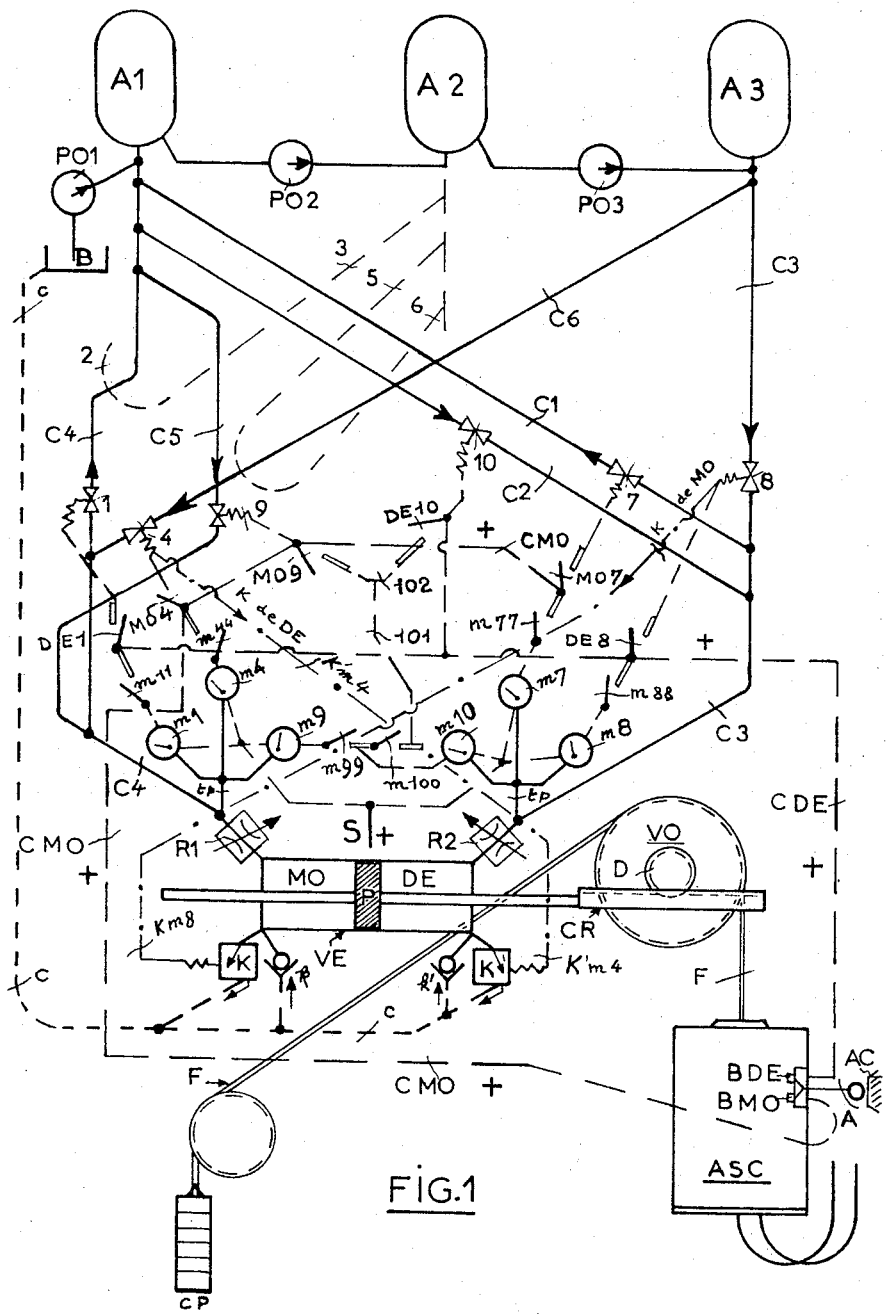

April 18, 1967 R. A. ROUGEMONT 3,314,500
ELEVATOR SYSTEM
Filed Nov. 30, 1965 2 Sheets-Sheet 1

Inventor
R. A. ROUGEMONT

By
Holcombe, Wetherill & Brisebois
Attorneys

United States Patent Office 3,314,500
Patented Apr. 18, 1967

3,314,500
ELEVATOR SYSTEM
Raoul Albert Rougemont, 6 Allee de la Residence de la
Peupleraie, Fresnes, France
Filed Nov. 30, 1965, Ser. No. 510,560
Claims priority, application France, Dec. 2, 1964, 997,027;
Nov. 24, 1965, 39,528, Patent 1,443,892
4 Claims. (Cl. 187—17)

The present invention relates to an elevator system for conveying passengers and goods or freight, such as automobiles, of the kind comprising a cabin counterbalanced by a counterweight connected to the cabin by a cable. The cable is driven under the control of a double-acting piston sliding in a cylinder and mounted on a piston rod extended to form a rack engaging a toothed wheel, on a shaft to which is keyed a pulley for the lift-cable. When, owing to the action of a compressed fluid introduced into the cylinder, the piston moves in one direction or the other, depending upon the side of the piston to which the compressed fluid is admitted, the rack effects appropriate rotation of the pulley, thus to cause the lift-cabin to ascend or descend.

In current practice, the construction of lifts always involves a counterweight which counterbalances more than the weight of the cabin. Moreover, the useful load can be variable or may even be nil when the cabin runs empty. The four following working conditions may be considered.

*1st Case:* Descent of the cabin so loaded that the total weight of the cabin together with its load is greater than that of the counterweight.
*2nd Case:* Descent of the cabin loaded, but the total weight of which is less than that of the counterweight.
*3rd Case:* Ascent of the cabin loaded, the total weight of which is greater than that of the counterweight, and
*4th Case:* Ascent of the cabin loaded, but the total weight of which is less than that of the counterweight.

In the first and fourth cases, there is no need to supply energy to move the lift. The excess of weight during descent ensures that the movement shall take place. But, it is moreover necessary to brake such movement so as to regulate the speed of descent.

On the other hand, in the two other cases, it is necessary to use energy in order to move the lift.

Under those conditions, it is an object of the invention to ensure braking together with recovery of energy, when loaded or not, when ascending or descending, more especially by delivering compressed fluid filling one of the sides of the cylinder into one or more oleo-pneumatic accumulators. The fluid so accumulated under pressure is re-utilised to control either the ascent or descent of the lift, or both, when they require energy consumption.

In a lift control of this kind, the pressure at which the compressed fluid is driven out of the driving cylinder, varies according to the circumstances. It is a further object of the invention to provide a further accumulator in parallel with the accumulator into which the compressed fluid is accumulated when it reaches its anticipated maximum pressure, and into which further accumulator the compressed fluid is delivered, when its pressure is lower than that of the first mentioned accumulator. Again, according to this invention, such accumulators can be multiplied by properly grading the pressures of the compressed fluid. This procedure affords the advantage that, due to the accumulation of the compressed fluid, the degree of energy recovery, in other words, the output of the lifting system, is increased.

The passage from one accumulator to another, according to the value of the pressures of the compressed fluid from one to another of the accumulators, according to the pressure of the compressed fluid during accumulation, is automatic and may be effected by means well known in the art.

Figure 2:
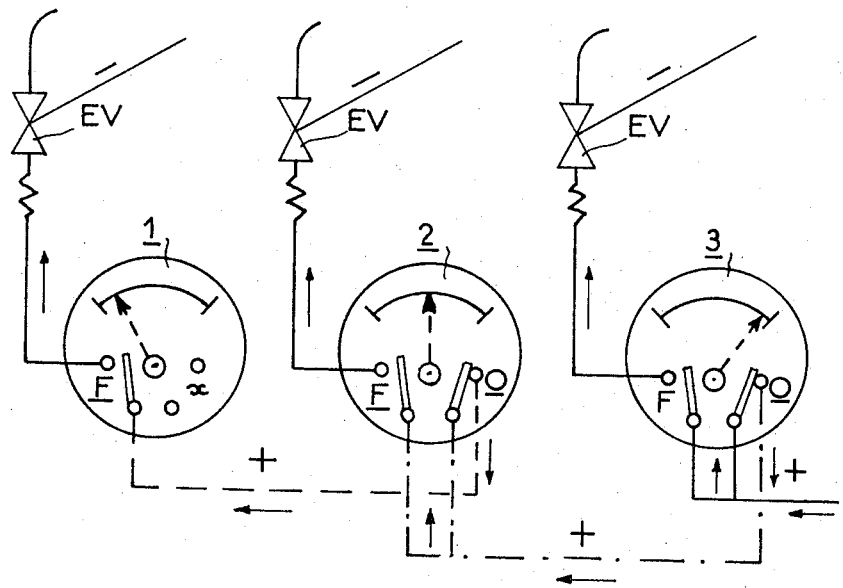

In order that the invention may be more clearly understood, reference will now be made to the accompanying drawings which illustrate one embodiment thereof, by way of example, and in which:

FIG. 1 shows a diagram of one form of lift driving arrangement according to the invention, and
FIG. 2 shows the electric connections of the contact manometers used in the driving system, according to FIG. 1.

Referring now to the drawings, in FIG. 1, ASC represents an elevator cabin which is connected to a counterweight CP by a cable F passing around a pully VO, mounted on a shaft to which is keyed a toothed pinion D engaging a rack CR mounted in extension of the piston rod of a piston P which is double-acting and reciprocates in a cylinder VE. To cause the lift to ascend when this requires energy, the compressed fluid, in this practical case consisting of oil under pressure, is introduced into chamber MO of the cylinder and to cause the lift to descend, when this requires energy, the fluid is introduced into chamber DE of the cylinder.

FIG. 1 shows three oleo-pneumatic accumulators A1, A2, A3 of any known kind.

Accumulator A1, the function of which is recovery of energy, is adjusted to the lowest pressure of the whole arrangement.

A2, for supplying energy, is adjusted to the maximum pressure of the arrangement.

A2 is symbolically represented, as is the piping 2–3–5–6, connected thereto, to indicate that other arrangements may exist embodying several other accumulators or sets of accumulators working at intermediate pressures, connected to identical circuits, for reducing in stages the pressure differences to be recovered or supplied in such a manner that this difference corresponds at the same time to a rational braking or minimum losses of pressure, which improves the output.

Accumulator A3 recharges accumulator A2 through pump PO3 provided with an electric motor driven by contact manometers, as soon as the pressure decreases by a certain value in this accumulator.

Accumulator A2 recharges accumulator A1 by pump PO3. Finally, A1 is charged by the fluid recovered and by a pump PO1 which takes its oil from a vessel B.

In the embodiment shown, the chamber DE of cylinder VE is connected to accumulator A1 through piping C1 in which is mounted an electrically-operated valve 7 and through piping C2 incorporating an electrically-operated valve 10, and to accumulator A3 through piping C3 incorporating an electrically-operated valve 8. The chamber MO of cylinder VE is connected to accumulator A1 through piping C4 incorporating an electrically-operated valve 1 and through piping C5 incorporating an electrically-operated valve 4.

The arrows in the drawing show the circulation of the compressed fluid to which the different valves open.

$m1$, $m4$, $m9$ are three contact manometers connected by means of piping $tp$ in piping C4, and $m8$, $m7$, $m10$ are three contact manometers connected by means of piping $tp'$ to piping C3. The contactors of these manometers are respectively $m11$, $m44$, $m99$ and $m100$, $m77$, $m88$. The manometers of each of these sets of three or more manometers are so adjusted as to cut off their contact at different pressures for each manometer. It results therefrom, according to the pressure available in piping C3, that it will be one or the other of these manometers which will shut off its contact according to the pressure available in piping C4 or C3 respectively.

The pressure being transmitted to the manometers through the chamber of the cylinder VE under pressure, it will be observed that piston P does not travel to the base of chamber DE or MO, as these chambers are longer than the stroke of piston P, so that there always remains an oil reserve sufficient for starting pressure in the manometers when the floor stop brake is released and consequently causes a pressure on one of the chambers of the cylinder.

FIG. 2 shows a more clearly detailed arrangement of such three-manometer set, e.g. manometers, $m1$, $m4$ and $m9$ but referred to in FIG. 2 as 1, 2 and 3 respectively.

FIG. 2 shows the assembly of a series of three manometers, the stage pressures of which could be for instance, according to requirements, 50 bars for Nr. 1 with a delay of 1 second, 100 bars for Nr. 2 with a delay of 0.5 second, and 200 bars for Nr. 3 with no delay.

It can immediately be seen that, should the pressure be 200 bars, the non-delayed manometer 3 would work at once and, through a contact F—only shut off through the effect of pressure—will transmit current to its electrically-operated valve. The valves for these manometers are indicated in FIG. 2 by EV.

As the contact O of the manometer opened at the same time, the current will not be passed on to the other manometers, because it is the contact O which controls the passage of current thereto.

But should pressure not be sufficient to operate manometer 3, it is manometer 2 working with a small delay which will operate. As contact O of manometer 3 then remains closed, the current passes on and feeds both contacts of manometer 2, whose contact F of which, when closing, actuates the corresponding electrically-operated valve and contact O of which, by opening, cuts out manometer 3 which in consequence is not in a position to work.

Should the pressure be even lower, it is manometer 1 which will operate, as contact O of manometer 2 will remain closed. In this example, manometer 3 is considered as an end of series, in consequence, it has but one contact F for the valve EV.

Several manometers could be located between manometers 1 and 3; it would then be sufficient to connect them up similarly to manometer 2.

These contact manometers placed in series in case of differential pressures-grading with the oleo-pneumatic accumulator sets, are suitable for recovery sets: 1(2, 3+$n$) or 7(+$n$) as well as for sets working for supply: 4(+$n$) and 8(+$n$).

In series with contact $m11$ is connected, in the controlling circuit of valve 1, switch DEI, also in series with $m44$, in the controlling circuit of valve 4, switch MO4, in series with $m77$, in the controlling circuit of valve 7, switch MO7, and in series with $m88$; and in the controlling circuit of valve 8, a switch DES. Finally, $m99$ and $m100$ are connected in series at conductor 101 which, in 102, divides into two branches, one of which leads to switch MO9, connected in the controlling circuit of valve 9 and the other to switch DE10, connected in the controlling circuit of valve 10. All these valves are, of course, electrically operated.

The circuits controlling valves 9 and 10 cannot work independently, as a matter of fact, they are three-contact valves and are balanced on a cylinder, both chambers of which are non-pressurised or under a very low pressure; and their function is to permit the system to work in both directions by load balancing. In such case, $m10$, delayed in order to avoid its working between two variations, establishes a first contact $m100$ (without any current towards the valve), and $m9$, delayed for a longer period and carrying current, establishes the second contact $m99$, the latter complementary, when 10 is stabilised.

From that moment and then only, $m9$, or, $m10$ will be in a position to work according to the direction set by the lift contactor on contact line CMO or contact line CDE.

The electric circuits in which switches $m11$, $m44$, $m99$, $m100$, $m77$, $m88$ are connected as also switches DE10, DE8, MO4, MO9, MO7, are all connected to one of the poles of the source of the controlling current, e.g. to the pole S, as shown the return to the other pole of the source being effected in the driven apparatus, in this case the electrically-operated valves, for instance by grounding each of these valves.

The arrangement is completed by drive control from an "ascent" button BMO and a "descent" button BDE provided in the lift cabin.

Operating button BDE controls the closing of switches DEI in the control circuit of electrically-operated valve 1, DE10 in the control circuit of valve 10, and DES in the control circuit of valve S. Operating button BMO controls the closing of switches MO4 in the circuit of valve 4, and MO9 in the circuit of valve 7.

A conventional floor stop control AC controls the stopping of the general system of the arrangement by cutting off the operative circuit CMO or CDE as the case may be. At that moment, the operating valve will return to its position corresponding to a cutting off of the hydraulic circuit by the action of a release spring or any other means and at a very accurately timed speed (with or without regulating chamber) so as to obtain a speed reduction in relation to the usage and speed of the elevator, the terminal phase giving an accurate stopping through clean breaking of the circuit.

At each end of cylinder VE, there is an automatic regulator RI and RE respectively, the inlet of which includes a tube calibrated in each direction with flap valves for controlling the flow of fluid passing through the pipes.

To the chamber MO there are also fitted a discharging flap valve K which is electrically-controlled at the same time as the valve 8, and a non-return flap valve $k$ which opens when the chamber MO is in the suction stroke and similarly to chamber DE are fitted a discharging flap valve K' electrically controlled at the same time as valve K, and a non-return valve $k'$ opening when chamber DE is on the suction stroke. All these flap valves are connected in piping C which is connected to a reservoir tank B.

Under these conditions, the elevator operating system according to the invention, works as follows:

As regards the description of the operations, it is necessary to examine the four cases set out above.

Thus, the first case is during descent of the cabin, loaded by a load such that the counterweight does not quite counterbalance the weight of the cabin together with its load.

It is easily understood that, under these conditions, the cabin will descend too quickly owing to this excess of weight and consequently according to the above kinematic formula, the volume of chamber DE of cylinder VE increases and the volume of chamber MA decreases.

As it is the cabin which is driven, it happens in fact that a depression takes place in chamber DE, the effect of which is, on the one hand, to admit through suction some oil from this chamber into an oil inlet provided with non-return valve $k$ and, on the other hand, that none of the manometers connected in piping C3 shuts off its contacts. On the contrary, there is on the side of chamber MO a compression of the oil contained therein and delivery of such oil through pipe C4 and through valve 1 in tank A1. Indeed, valve 1 is open because, due to the fact that it is a descent that has been effected, switch DE is shut off as also contact $m11$ of manometer $m1$.

The second case concerns the cabin descending when the weight of the latter including its load is lower than that of the counterweight. In this case, more energy must be consumed to effect descent. This happens as follows: manometer $m8$ having opened switch $m88$, and switch DE8 having been closed, it is valve 8 which opens and lets compressed oil from tank A3 pass through pipe C3 into chamber DE which in consequence gets larger owing to movement of piston P towards the left of the drawing. During this time, the oil being in MO flows out through flap valve K toward oil reservoir B.

The third case to examine is that of the cabin ascending, loaded with such a load that the total weight of cabin and load is higher than that of the counterweight. It is easily understood that in such case, it is necessary to consume energy in order to cause ascent of the cabin.

This is effected as follows: button BMO having been actuated from the cabin, the chamber MO of cylinder VE is fed from tank A3 through pipe C6 and valve 4. During this time, chamber DE of cylinder VE is emptying through valve K in the direction of the oil recovery tank B.

The fourth case concerns the cabin going up, loaded with such a light weight that the total weight of cabin and load is lower than that of the counterweight. In this case, as a matter of fact, the ascent motion is effected through the action of the counterweight.

In consequence, recovery of energy takes place as follows: as a result of shutting off, in this case switch M77 of manometer 7 and switch MO7, valve 7 will open and the oil contained in DE is discharged to tank A1.

During this time, chamber MO sucks oil, as a result of depression, through automatic flap valve k.

I claim:

1. An elevator system including a cabin counter-balanced by a counterweight connected to said cabin by a cable, said cable passing around a driving pully fastened to a toothed pinion engaging a rack forming an extension of a piston rod, the piston of which slides in a double-acting cylinder fed with compressed oil, characterised in that, upon movement of the elevator cabin in one direction due to an excess of weight, the oil flowing out of the cylinder during this movement is recovered in oleo-pneumatic accumulator means for subsequent re-use for at least one elevator operation requiring consumption of energy, and operative under the effect of a synchronised automatic system for recovering and re-using the energy of the oil, controlled by a control member for effecting the ascent and descent of the elevator and located in said cabin, and further characterised by an elevator-speed regulating system comprising calibrated tubes, the section and length of which are set up according to the pressure difference of each oleo-pneumatic accumulator in said accumulator means.

2. An elevator system according to claim 1, wherein said accumulator means comprises at least two accumulators recovering the oil delivered from said cylinder, said accumulators operating at different pressures and the highest pressure tank being fed from a lower pressure tank through suitable pump means.

3. An elevator system according to claim 1, wherein said accumulator means comprises a plurality of oil-recovering tanks, said tanks operating at different pressures, and any two adjacent tanks being connected through pump means.

4. An elevator system according to claim 3, wherein said accumulators are connected to said cylinder by oil pipes, electrically-operated valves being mounted in said pipes, two series-mounted switches being connected in said pipes to control each of said valves, one of said valves closing when indicating a descent or ascent control for said elevator, and the other of said switches closing through a manometer measuring the pressure in the corresponding oil circuit.

References Cited by the Examiner
UNITED STATES PATENTS

| | | | |
|---|---|---|---|
| 965,542 | 7/1910 | Schuller | 187—17 |
| 1,159,038 | 11/1915 | Sansson | 187—17 |
| 1,892,829 | 1/1933 | Choate | 254—186 |
| 2,732,180 | 1/1956 | Gratzmuller | 254—186 |

EVON C. BLUNK, *Primary Examiner.*

H. C. HORNSBY, *Assistant Examiner.*